United States Patent
Fox

(10) Patent No.: US 9,556,945 B2
(45) Date of Patent: Jan. 31, 2017

(54) ELECTRONICALLY ACTUATED LOCKING DIFFERENTIAL HAVING NON-ROTATING STATOR AND ARMATURE

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 131 days.

(21) Appl. No.: 14/401,975

(22) PCT Filed: May 3, 2013

(86) PCT No.: PCT/US2013/039426
§ 371 (c)(1),
(2) Date: Nov. 18, 2014

(87) PCT Pub. No.: WO2013/176866
PCT Pub. Date: Nov. 28, 2013

(65) Prior Publication Data
US 2015/0133254 A1 May 14, 2015

Related U.S. Application Data

(60) Provisional application No. 61/650,620, filed on May 23, 2012, provisional application No. 61/813,231, filed on Apr. 18, 2013.

(51) Int. Cl.
*F16H 48/34* (2012.01)
*F16H 48/24* (2006.01)
(Continued)

(52) U.S. Cl.
CPC ............. *F16H 48/34* (2013.01); *F16H 48/08* (2013.01); *F16H 48/22* (2013.01); *F16H 48/24* (2013.01); *F16H 2048/346* (2013.01)

(58) Field of Classification Search
CPC .......... F16H 48/08; F16H 48/22; F16H 48/24; F16H 48/34; F16H 2048/346
See application file for complete search history.

(56) References Cited

U.S. PATENT DOCUMENTS 5,030,181 A    7/1991  Keller
6,551,209 B2 *  4/2003  Cheadle ................. F16H 48/22
                                                      192/84.92
(Continued)

FOREIGN PATENT DOCUMENTS

EP      1568917      8/2005
JP      2007002959 A  1/2007
(Continued)

OTHER PUBLICATIONS

Third-Party Submission document from Japanese Patent Office dated Mar. 16, 2016 for Japanese Application 2015-514038 (which is a corresponding application to U.S. Appl. No. 14/401,975), 8 pages.

(Continued)

*Primary Examiner* — Jacob S Scott
(74) *Attorney, Agent, or Firm* — Remarck Law Group PLC

(57) ABSTRACT

An electronically actuated locking differential for an automotive vehicle includes a gear case, a pair of side gears disposed within the gear case and operatively adapted for rotation with a corresponding pair of axle half shafts, and a lock plate disposed within the gear case and operably associated with one of the side gears and being movable axially relative to the one of the side gears. The electronically actuated locking differential also includes a return spring disposed within the gear case and cooperating with the lock plate to bias the lock plate axially away from one of the side gears and an electronic actuator cooperating with the lock plate, the electronic actuator having a non-rotating (Continued)

Figure 1:
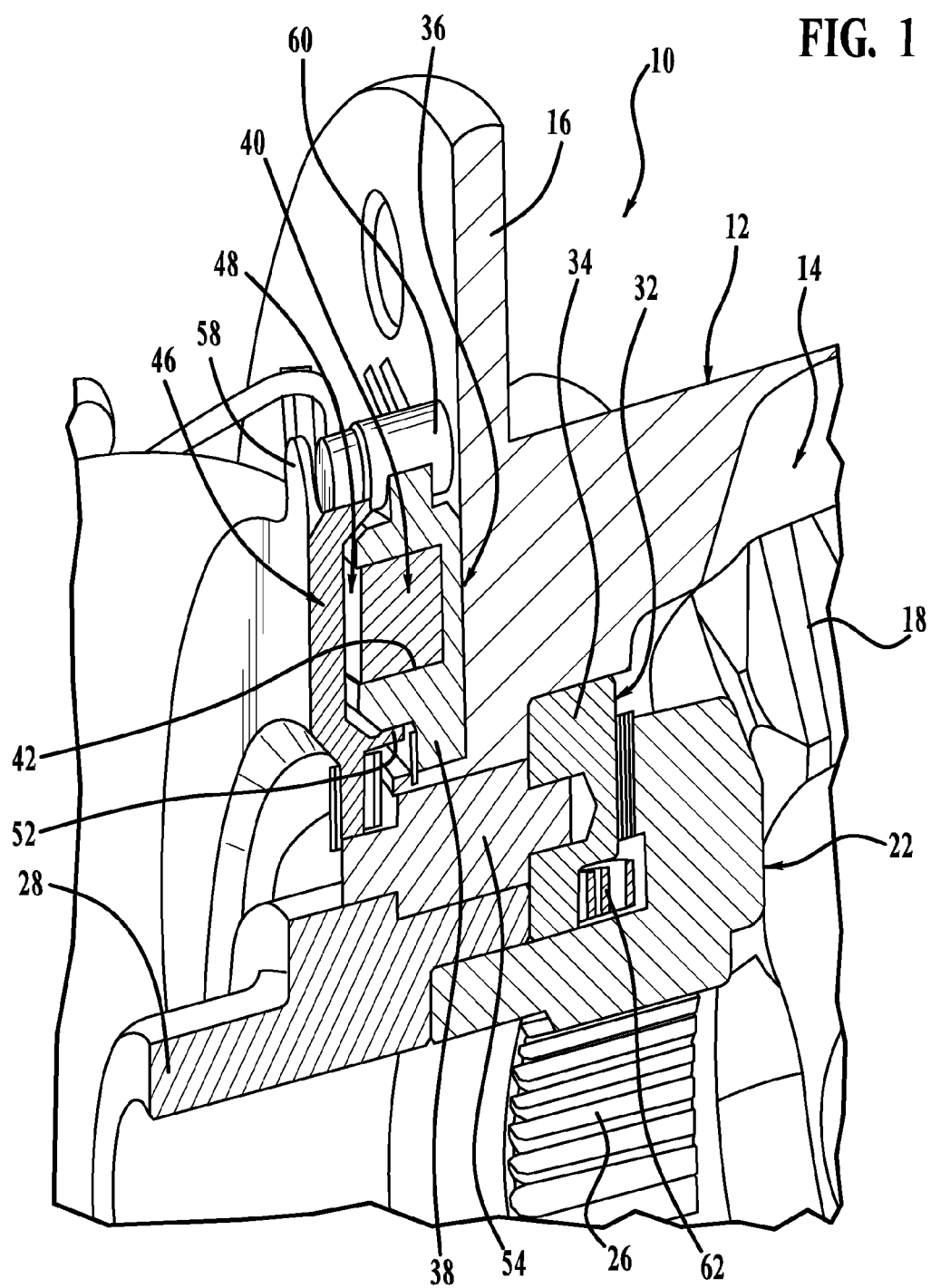

stator disposed about a portion of the gear case, an electromagnetic coil associated with the stator, and a non-rotating armature coupled to the lock plate and being axially movable relative to the stator.

13 Claims, 2 Drawing Sheets

(51) Int. Cl.
F16H 48/22 (2006.01)
F16H 48/08 (2006.01)

(56) References Cited

U.S. PATENT DOCUMENTS

| 2005/0070393 | A1 | 3/2005 | Degowske | |
| 2005/0187063 | A1* | 8/2005 | Haruki | F16H 48/08 475/231 |
| 2006/0270512 | A1 | 11/2006 | Pinkos | |
| 2007/0197338 | A1 | 8/2007 | Fusegi | |
| 2008/0182702 | A1 | 7/2008 | Donofrio | |
| 2008/0254931 | A1* | 10/2008 | Sugaya | F16H 48/08 475/238 |
| 2010/0056314 | A1* | 3/2010 | Maruyama | F16H 48/08 475/150 |

FOREIGN PATENT DOCUMENTS

| JP | 2010501803 A | 1/2010 |
| WO | 20070100545 | 9/2007 |
| WO | 2008024333 A2 | 2/2008 |
| WO | 20110064364 | 6/2011 |

OTHER PUBLICATIONS

PCT International Search Report mailed Aug. 13, 2013 for PCT International Application No. PCT/US2013/039426, 4 pages.

* cited by examiner

ELECTRONICALLY ACTUATED LOCKING DIFFERENTIAL HAVING NON-ROTATING STATOR AND ARMATURE

CROSS-REFERENCE TO RELATED APPLICATIONS

This application is a 371 U.S. National Stage of International Application No. PCT/US2013/039426, filed May 3, 2013, which claims priority to U.S. Provisional Application No. 61/650,620 filed on May 23, 2012 and U.S. Provisional Application No. 61/813,231 filed on Apr. 18, 2013. The disclosure of each of the above applications is incorporated herein by reference in their entirety.

FIELD

The present teachings relate, in general, to electronically actuated locking differentials and, in particular to an electronically actuated locking differential having a non-rotating stator and armature for operation of the differential.

BACKGROUND

In automotive applications, an electronically actuated locking differential of the related art may be actuated electronically and is designed for forward-wheel-drive (FWD), rear-wheel-drive (RWD), all-wheel-drive (AWD), and four-wheel-drive (4WD) vehicles to allow the differential to be locked or unlocked when it is so desired. The driver can lock the front and/or rear wheels by manually activating a switch or button mounted to a dash or console of the vehicle. In this type of torque-controlling device, the armature is allowed to spin or rotate with the differential and the armature is not mechanically attached to a lock plate within the differential.

While locking differentials of this type have generally worked for their intended purposes, certain disadvantages remain. More specifically, these arrangements limit the ability to electronically sense the locked state of the differential. Further, adding a sensor to a rotating armature might be a cause for increased costs because the sensor is non-contacting. Also, wear and durability become a concern with any sensor being attached to a rotating armature.

Thus, there remains a need in the art for an electronically actuated locking differential that is capable of locking the right-hand and left-hand axles independent of the driveline rotation and allow them to remain locked independent of vehicle direction. In particular, there is a need in the related art for an electronically actuated locking differential that incorporates these features.

SUMMARY

The present teachings include an electronically actuated locking differential for an automotive vehicle including a gear case, a pair of side gears disposed within the gear case and operatively adapted for rotation with a corresponding pair of axle half shafts, and a lock plate disposed within the gear case and operably associated with one of the side gears and being movable axially relative to the one of the side gears. The electronically actuated locking differential also includes a return spring disposed within the gear case and cooperating with the lock plate to bias the lock plate axially away from the one of the side gears and an electronic actuator cooperating with the lock plate, the electronic actuator having a non-rotating stator disposed about a portion of the gear case, an electromagnetic coil associated with the stator, and a non-rotating armature coupled to the lock plate and being axially movable relative to the stator. When direct current (DC) power is supplied to the electromagnetic coil, magnetic energy is generated within the stator creating an attractive force between the armature and the stator to generate a force transferred to the lock plate causing it to compress the return spring and engage the side gear locking it to the gear case and thus locking the pair of axle half shafts.

In one aspect of the present teachings, the new non-rotating electronic actuator enables ease of lock detection by repositioning a slip ring away from an electromagnetic coil, allowing both the stator and armature to remain stationary relative to the differential's rotation. By not allowing the armature to rotate, parasitic losses can be eliminated when the differential is locked because any fictional drag between the armature and stator is eliminated. The electronic actuator of the present teachings also creates less heat within the differential due to less friction. Since the armature is mechanically coupled to the lock plate, the electronic actuator of the present teachings can detect or sense when the differential is locked or unlocked based on the axial position of the armature. Since the armature does not rotate, the electronic actuator of the present teachings is not concerned with runout or gap changes when rotating when using contact sensors and not concerned with a mechanical or electronic slip ring arrangement when using contact sensors.

DRAWINGS

Figure 2:
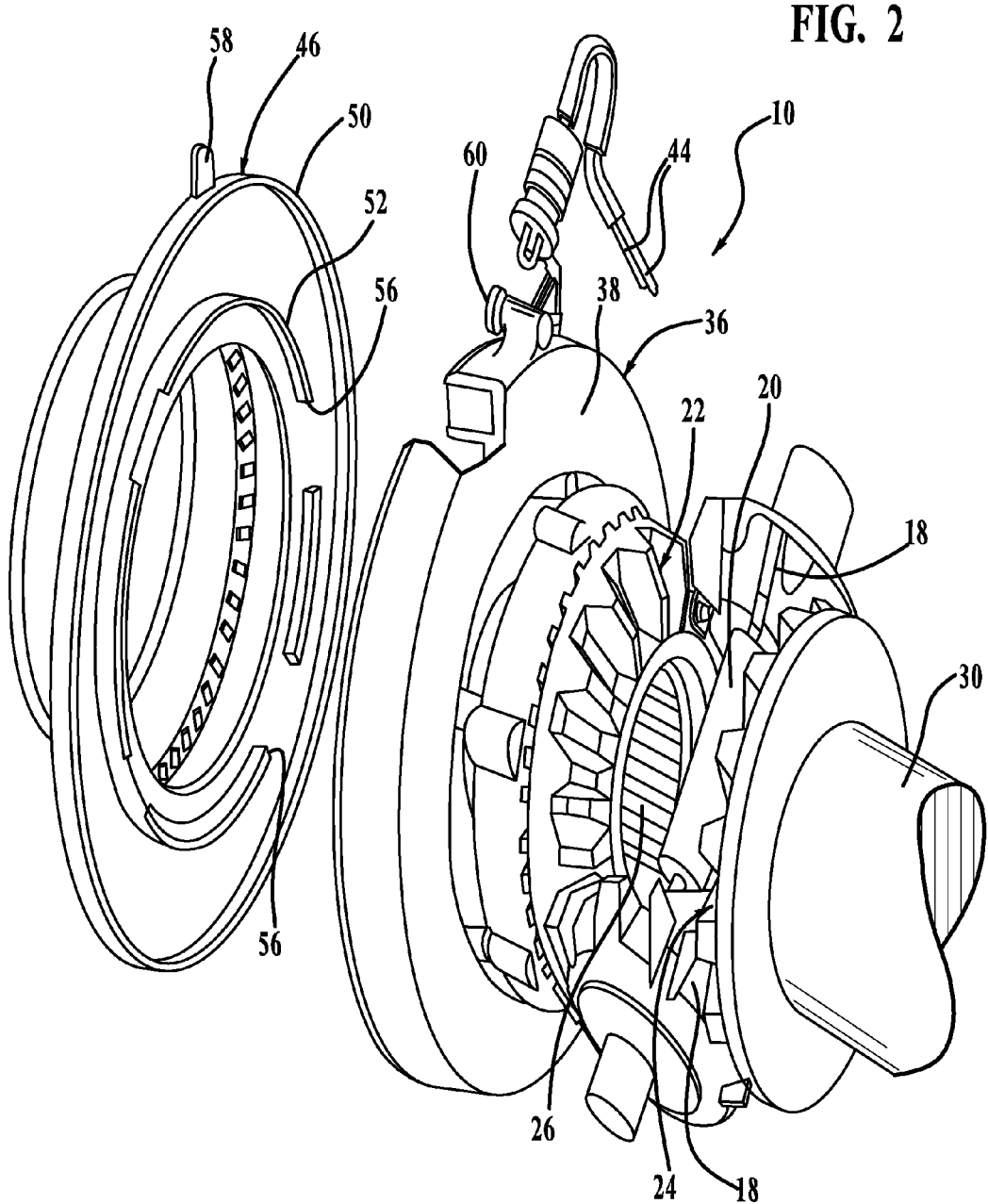

Other aspects of the present teachings will be readily appreciated as the same becomes better understood after reading the subsequent description taken in connection with the accompanying drawings wherein:

FIG. 1 is a partial perspective fragmentary view of an electronically actuated locking differential of the present teachings; and FIG. 2 is an exploded view of the electronically actuated locking differential of the present teachings.

DETAILED DESCRIPTION

One representative example of an electronically actuated locking differential of the type contemplated by the present teachings is generally indicated at 10 in FIGS. 1 and 2. As shown in FIGS. 1 and 2, the differential 10 includes a gear case, generally indicated at 12, and an end cap (not shown), which may be fastened to the gear case 12 by any suitable fastener, such as by a plurality of bolts (not shown). The gear case 12 and end cap cooperate with each other to define a gear chamber, generally indicated at 14. Torque input to the differential 10 is typically by an input ring gear (not shown), which may be attached to a flange 16. A gear set is supported within the gear chamber 14 and has at least a pair of input pinion gears 18. The pinion gears 18 are mounted rotatably about a pinion shaft 20, which is secured relative to the gear case 12 by any suitable mechanism. The pinion gears 18 are input gears of the gear set and in meshing engagement with a respective pair of left and right side gears, generally indicated at 22, 24. The side gears 22, 24 define respective sets of internal, straight splines 26 (only one shown for gear 22) that are adapted to be in splined engagement with mating external splines on a respective pair of left and right axle shafts (not shown). The gear case 12 defines annular hub portions 28, 30 on which may be mounted a respective pair of bearing sets (not shown) that are used to provide rotational support for the rotating differential 10 relative to an outer housing or carrier (not shown).

A rotation-prevention mechanism, generally indicated at 32, has a generally annular collar member or lock plate 34 and is disposed entirely within the gear case 12 and operably associated with side gear 22 (the first output gear). The lock plate 34 is spaced from the side gear 22 and is slideable along the outer surface of the side gear 22. An electronic actuator, generally indicated at 36, is disposed primarily external to the gear case 12. More specifically, the electronic actuator 36 is disposed at the end of and about the gear case 12 adjacent side gear 22 (the first output gear). The electronic actuator 36 has a stator 38 primarily external to the gear case 12. More specifically, the stator 38 is disposed at the end of and about the gear case 12 adjacent to the flange 16. The stator 38 is stationary and non-rotating relative to the gear case 12. The electronic actuator 36 also has an electromagnetic coil, generally indicated at 40, that is disposed in a cavity 42 of the stator 38. The electromagnetic coil 40 is energized by a pair of electrical leads 44 and receives direct current (DC) from a source (not shown). The electronic actuator 36 also has an armature, generally indicated at 46, spaced from the electromagnetic coil 40 to form a gap 48 therebetween. The armature 46 is a generally circular plate and has an outer flange 50 extending axially and an inner flange 52 extending axially and spaced radially from the outer flange 50. The armature 46 is mechanically coupled to the lock plate 34 by an annular slip ring 54. The inner flange 52 has a plurality of cutouts 56 spaced circumferentially thereabout. The cutouts 56 arranged radially in the armature 46 focus the magnetic energy and maximize the force potential in these areas. The armature 46 also has a radially extending target flange 58 extending outwardly from the outer flange 50. The armature 46 is non-rotating, but movable axially relative to the stator 38. The actuator 36 includes a sensor 60 attached to the flange 16 of the gear case 12 and disposed opposite the target flange 58 of the armature 46 to sense when the differential 10 is locked or unlocked based on the axial position of the armature 46. The sensor 60 is a contact sensor. The lock plate 34 is biased toward the non-actuated, "unlocked" mode by a return spring 62 such as a wave spring. It should be appreciated that other types of sensors may be used such as non-contact sensors, for example, Hall Effect or proximity sensors.

The cutouts 56 arranged radially in the armature 46 focus the magnetic energy and maximize the force potential in these areas of the actuator 36 whereas some of the magnetic energy is bled off in the areas where there is pilot, which does not turn into usable force. These cutouts 56 are one to one to optimize the force potential of the present teachings.

During normal, straight-ahead operation of a vehicle within which the differential 10 is employed, no differentiation occurs between the left and right axle shafts or side gears 22, 24. Therefore, the pinion gears 18 do not rotate relative to the pinion shaft 20. As a result, the gear case 12, pinion gears 18, and side gears 22, 24 all rotate about an axis of rotation as if the gear case 12, pinion gears 18, and side gears 22, 24 are a solid unit.

When direct current (DC) power is supplied to the electromagnetic coil 40, magnetic energy is generated within the stator 38 which creates an attractive force between the armature 46 and stator 38 starting at around 40 lbf and ending at around 250 lbf and causing the armature 46 to move toward the stator 38. This force is transferred through the slip ring 54 and to the lock plate 34 compressing the return spring 62 until the lock plate 34 exerts a required retarding torque on the side gear 22, locking it to the differential case 12 and thus locking the LH and RH axle shafts independent of driveline rotation. It should be appreciated in light of the disclosure that the differential 10 allows the LH and RH axle shafts to remain locked independent of vehicle direction. It should also be appreciated in light of the disclosure that the differential 10 is preferred for applications where frequent rock cycles or direction reversals are common such as during snow plowing. It should further be appreciated in light of the disclosure that the differential 10 also enables ease of lock detection by repositioning the slip ring 54 away from the electromagnetic coil 40, allowing both the stator 38 and the armature 46 to remain stationary relative to the rotation of the differential 10.

The differential 10 may be controlled manually, wherein a driver of the vehicle manually selects "locked" mode (rather than "unlocked" mode) to operate the differential 10. For example, when, say the vehicle is at rest, the driver simply manually activates a switch or button (not shown), such as a simple momentary-type "on/off" toggle or rocker switch or push button, mounted to a dash or console (not shown) of the vehicle. In this way, an electric circuit (not shown) is closed, thereby turning on current in the circuit and a lamp (not shown) located in or near the toggle switch or push button to indicate to the driver that the differential is actuated. Current flows in the circuit and ultimately to the electromagnetic coil 48 of the differential 10. The differential 10 then operates in the "locked" mode (i.e., when the vehicle is in first gear or reverse). In this way, the first output gear 22 is locked relative to the gear case 12, preventing any further differentiation between the first output gear 22 and gear case 12.

By not allowing the armature 46 to rotate, parasitic losses can be eliminated when the differential 10 is locked because any frictional drag between the armature 46 and the stator 38 is eliminated. The electronic actuator 36 of the present teachings creates less heat within the differential 10 due to less friction. Since the armature 46 is mechanically coupled to the lock plate 34, locking and unlocking of the differential 10 can be detected or sensed based on the axial position of the armature 46.

The teachings have been described in great detail in the foregoing specification, and it is believed that various alterations and modifications of the many aspects of the present teachings will become apparent to those having ordinary skill in the art from a reading and understanding of the specification. It is intended that all such alterations and modifications are included in the teachings, insofar as they come within the scope of the appended claims.

The following is a list of reference numerals used in the disclosure:

10 differential;
12 gear case;
14 gear chamber;
16 flange;
18 pinion gears;
20 pinion shaft;
22, 24 side gears;
26 splines;
28, 30 hub portions;
32 rotation-prevention mechanism;
34 lock plate;
36 electronic actuator;
38 stator;
40 electromagnetic coil;
42 cavity;
44 electrical leads;
46 armature;

48 gap;
50 outer flange;
52 inner flange;
54 slip ring;
56 cutouts;
58 target flange;
60 sensor; and
62 return spring.

What is claimed is:

1. An electronically actuated locking differential comprising:
   a gear case;
   a pair of side gears disposed within said gear case and operatively adapted for rotation with a corresponding pair of axle half shafts;
   a lock plate disposed within said gear case and operably associated with one of said side gears and being movable axially relative to the one of said side gears;
   a return spring disposed within said gear case and cooperating with said lock plate to bias said lock plate axially away from the one of said side gears; and
   an electronic actuator cooperating with said lock plate, said electronic actuator comprising a stator disposed about a portion of said gear case, an electromagnetic coil associated with said stator, and an armature coupled to said lock plate and being axially moveable relative to said stator, wherein said armature is a generally circular plate and has an outer flange extending axially and an inner flange extending axially, said inner flange having a plurality of cutouts spaced circumferentially thereabout, said stator and said armature non-rotatably fixed relative to each other and relative to said gear case;
   wherein direct current (DC) power is supplied to said electromagnetic coil and magnetic energy is generated within said stator creating an attractive force between said armature and said stator to generate a force transferred to said lock plate causing it to compress said return spring and engage said side gear locking it to said gear case and thus locking the pair of axle half shafts, wherein said plurality of cutouts focus the magnetic energy and maximize the force potential thereat.

2. An electronically actuated locking differential as set forth in claim 1 wherein said actuator has a target flange extending radially.

3. An electronically actuated locking differential as set forth in claim 2 including a sensor attached to said stator opposite said target flange for sensing whether a locked or unlocked condition exists based on the axial position of said target flange relative to said sensor.

4. An electronically actuated locking differential as set forth in claim 3 wherein said sensor is a contact sensor.

5. An electronically actuated locking differential as set forth in claim 3 wherein said sensor is a non-contact sensor.

6. An electronically actuated locking differential as set forth in claim 1 including a slip ring mechanically coupled to said armature and said lock plate.

7. An electronically actuated locking differential as set forth in claim 1 wherein said stator has a cavity and said electromagnetic coil is received in said cavity of said stator.

8. An electronically actuated locking differential comprising:
   a gear case;
   a pair of side gears disposed within said gear case and operatively adapted for rotation with a corresponding pair of axle half shafts;
   a lock plate disposed within said gear case and operably associated with one of said side gears and being moveable axially relative to the one of said side gears;
   a return spring disposed within said gear case and cooperating with said lock plate to bias said lock plate axially away from the one of said side gears;
   an electronic actuator cooperating with said lock plate, said electronic actuator comprising a stator disposed about a portion of said gear case, an electromagnetic coil associated with said stator, and an armature coupled to said lock plate and being axially moveable relative to said stator, wherein said armature is a generally circular plate and has an outer flange extending axially and an inner flange extending axially, said inner flange having a plurality of cutouts spaced circumferentially thereabout, said stator and said armature non-rotatably fixed relative to each other and relative to said gear case;
   wherein direct current (DC) power is supplied to said electromagnetic coil and magnetic energy is generated within said stator creating an attractive force between said armature and said stator to generate a force transferred to said lock plate causing it to compress said return spring and engage said side gear locking it to said gear case and thus locking the pair of axle half shafts, wherein said plurality of cutouts focus the magnetic energy and maximize the force potential thereat; and
   a target flange extending radially from said armature and a sensor attached to said stator opposite said target flange for sensing whether a locked or unlocked condition exists based on the axial position of said target flange relative to said sensor.

9. An electronically actuated locking differential as set forth in claim 8 wherein said sensor is a contact sensor.

10. An electronically actuated locking differential as set forth in claim 8 wherein said sensor is a non-contact sensor.

11. An electronically actuated locking differential as set forth in claim 8 wherein, said target flange extends from said outer flange.

12. An electronically actuated locking differential as set forth in claim 8 including a slip ring mechanically coupled to said armature and said lock plate.

13. An electronically actuated locking differential as set forth in claim 8 wherein said stator has a cavity and said electromagnetic coil is received in said cavity of said stator.

* * * * *